(12) United States Patent
Paulino et al.

(10) Patent No.: US 8,275,620 B2
(45) Date of Patent: Sep. 25, 2012

(54) CONTEXT-RELEVANT IMAGES

(75) Inventors: Roderick C. Paulino, Renton, WA (US); Jimmy Y. Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 12/482,501

(22) Filed: Jun. 11, 2009

(65) Prior Publication Data

US 2010/0318361 A1    Dec. 16, 2010

(51) Int. Cl.
*G10L 13/00*     (2006.01)
(52) U.S. Cl. .................. 704/260; 704/258; 715/257
(58) Field of Classification Search .............. 704/258, 704/260; 715/257
See application file for complete search history.

(56) References Cited

U.S. PATENT DOCUMENTS

| | | | |
|---|---|---|---|
| 4,689,768 A * | 8/1987 | Heard et al. ................. | 715/257 |
| 6,490,563 B2 | 12/2002 | Hon et al. ................... | 704/260 |
| 6,563,514 B1 | 5/2003 | Samar ......................... | 345/711 |
| 6,647,383 B1 | 11/2003 | August et al. ................ | 707/3 |
| 2003/0145285 A1 * | 7/2003 | Miyahira et al. ............. | 715/533 |
| 2005/0125228 A1 | 6/2005 | Samuels ...................... | 704/260 |
| 2005/0235031 A1 | 10/2005 | Schneider et al. ........... | 709/203 |
| 2006/0149558 A1 | 7/2006 | Kahn et al. ................... | 704/278 |
| 2007/0213983 A1 | 9/2007 | Ramsey ....................... | 704/254 |
| 2008/0267503 A1 * | 10/2008 | Denoue et al. ............... | 382/177 |

FOREIGN PATENT DOCUMENTS

WO    WO 0060560 A1    12/2000

OTHER PUBLICATIONS

Victoria Martin, "CALICO Software Review," Calico Journal, vol. 18, No. 1., pp. 147-155, Dec. 1999, https://www.calico.org/p-158-Atajo%203%20(121999).html.

Adam Pash, "Universal Spell Check and Dictionary with Enso Words," 5 pgs., Feb. 11, 2008, http://www.lifehacker.com.au/2008/02/universal_spell_check_and_dictionary_with_enso_words-2/.

* cited by examiner

*Primary Examiner* — Daniel D Abebe
(74) *Attorney, Agent, or Firm* — Merchant & Gould

(57) ABSTRACT

Assistive, context-relevant images may be provided. First, text may be received. Then a spell check indication may be received and a spelling check may be performed on the received text in response to the received spell check indication. Next, in response to the performed spelling check, a misspelling indication may be provided configured to indicate that at least one word in the received text is misspelled. A selection of the misspelling indication may then be received. Then, on a display device in response to the received selection of the misspelling indication, a plurality of suggested spellings for the at least one word and an image corresponding to a first one of the plurality of suggested spellings for the at least one word may be displayed.

20 Claims, 9 Drawing Sheets

CONTEXT-RELEVANT IMAGES

BACKGROUND

Illiteracy is the inability to read or write simple sentences in any language. Functional illiteracy is a term used to describe reading and writing skills that are inadequate to cope with the demands of everyday life. A functionally illiterate person can read and possibly write simple sentences with a limited vocabulary, but cannot read or write well enough to deal with the everyday requirements of life in his own society. For example, an illiterate person may not understand the written words "cat" or "dog", and may not recognize alphabet letters. A functionally illiterate person may well understand these words and more, but cannot read well enough to understand the things he must read in order to get by in his daily life, such as job advertisements, past-due notices, newspaper articles, complex signs, and posters. While pure illiteracy has approximately the same characteristics worldwide, the characteristics of functional illiteracy vary from one culture to another, as some cultures require better reading and writing skills than others.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Assistive, context-relevant images may be provided. First, text may be received. Then a spell check indication may be received and a spelling check may be performed on the received text in response to the received spell check indication. Next, in response to the performed spelling check, a misspelling indication may be provided configured to indicate that at least one word in the received text is misspelled. A selection of the misspelling indication may then be received. Then, on a display device in response to the received selection of the misspelling indication, a plurality of suggested spellings for the at least one word and an image corresponding to a first one of the plurality of suggested spellings for the at least one word may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
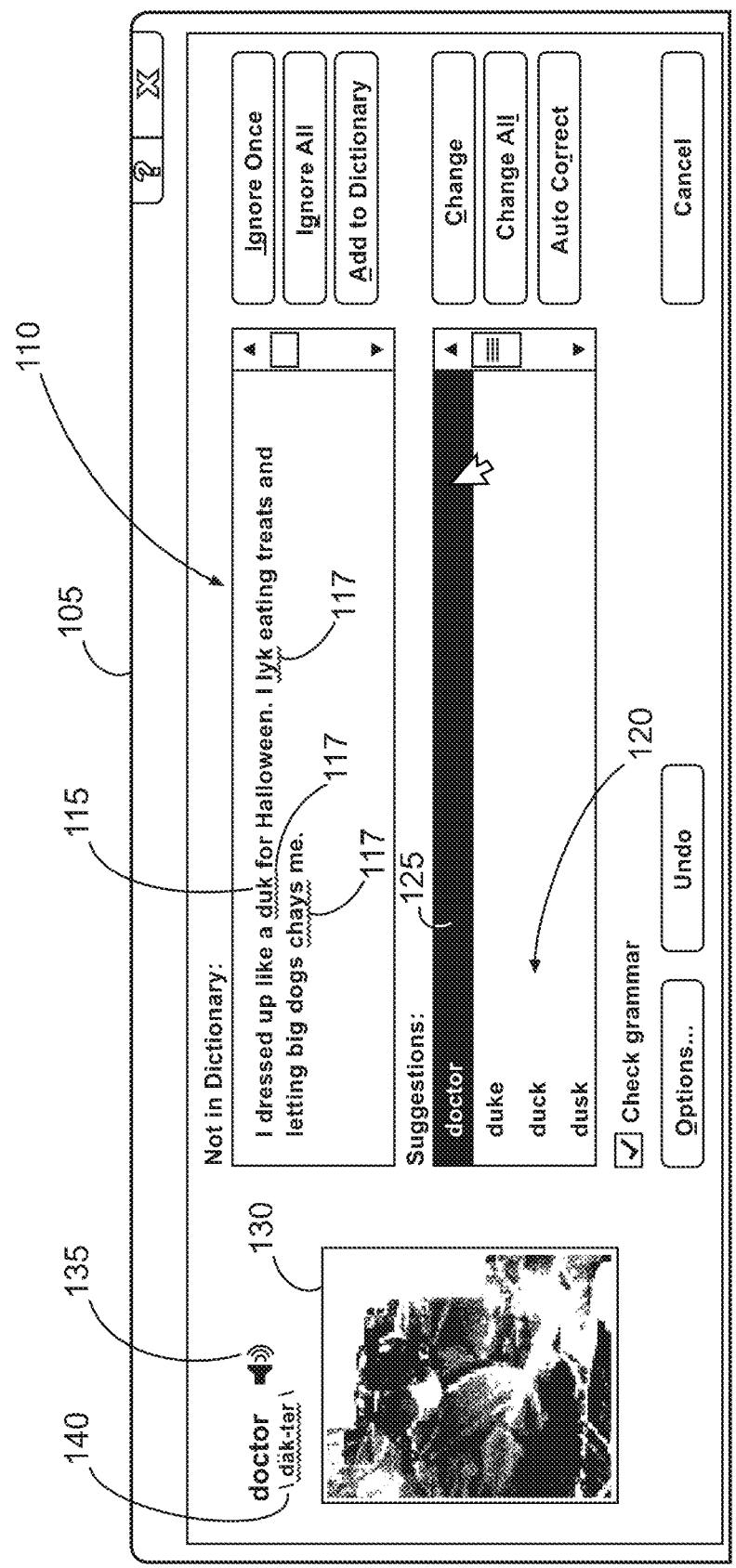
FIG. 1 is a screen shot illustrating a dialog box.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the present invention, functional illiterates may be provided the ability to view context-relevant images and links to content during the review of spelling and/or grammar within, for example, software/hardware/online services' graphical interfaces and "ease-of-use" guides. Embodiments of the invention may also be used, for example, to help those just learning a language (e.g. school students) or those learning a second language (e.g. English as a second language). For example, learners may hone their language (e.g. English) skills by associating context-relevant pictures, phonetics, and sound to enhance and propel their individualized learning experiences.

FIG. 1 shows a dialog box 105 consistent with embodiments of the invention. As shown in FIG. 1, text 110 may include a misspelled word 115. As a result of running a spelling check on text 110, a misspelling indication 117 may be placed under misspelled word 115. A plurality of suggested spellings 120 for misspelled word 115 may be provided in dialog box 105. A first suggested spelling 125 may be highlighted. Consistent with embodiments of the invention, when one of the plurality of suggested spellings 120 is highlighted, an image, a sound button, and a phonetic spelling of the highlighted word may be provided in dialog box 105.

Consistent with embodiments of the invention, when first suggested spelling 125 is highlighted, a first image 130 corresponding to first suggested spelling 125 may be provided in dialog box 105. When a first sound button 135 is selected by a user, a sound may be provided that corresponds to first image 130 and first suggested spelling 125. A first phonetic spelling 140 of first suggested spelling 125 may also be provided in dialog box 105. When a user causes others of the plurality of suggested spellings 120 to be highlighted, similar corresponding images, sound buttons, and phonetic spellings may be provided in dialog box 105. Moreover, consistent with embodiments of the invention, audible pronunciation assistance of an entire string of words (e.g. phrase, sentence, paragraph, etc.) may be provided to assist in verification of intended meaning when a string of words is selected from text 110.

Embodiments of the invention may be used with any type of software package including, but not limited to, website designer software, word processing software, spreadsheet software, e-mail software, database software, project management software, and presentation software. The aforementioned software packages are examples and, as previously stated, embodiments of the invention may be used with any software package type.

Figure 2:
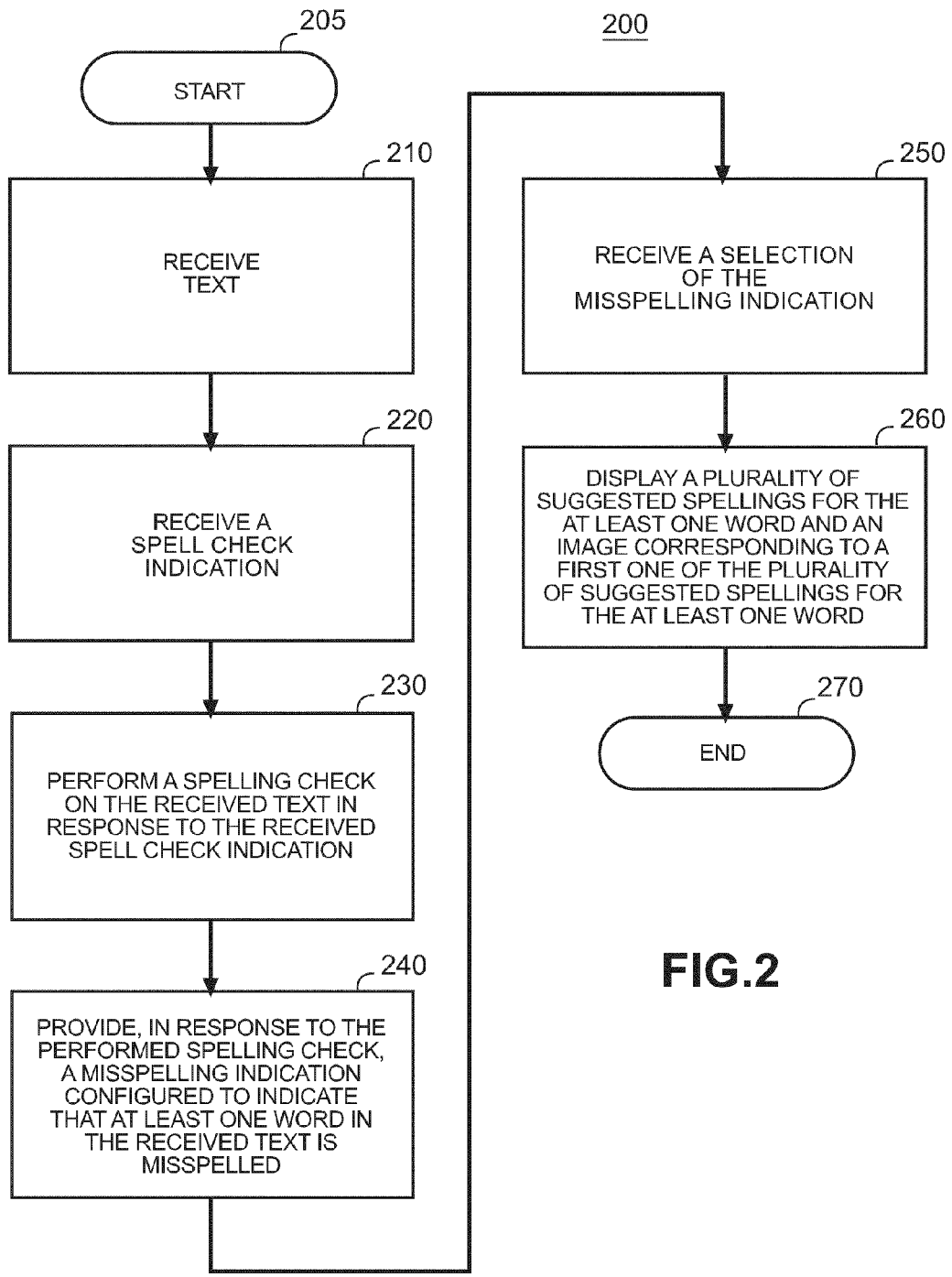
FIG. 2 is a flow chart of a method for providing assistive, context-relevant images.

FIG. 2 is a flow chart setting forth the general stages involved in a method 200 consistent with an embodiment of the invention for providing assistive, context-relevant images. Method 200 may be implemented using a computing device 900 as described in more detail below with respect to FIG. 9. Ways to implement the stages of method 200 will be described in greater detail below.

Method 200 may begin at starting block 205 and proceed to stage 210 where computing device 900 may receive text. For example, the user may be a small flower shop business owner who wishes to build her business' brand recognition, online presence, and drive foot traffic to her retail store. Consequently, the user may decide to use a website designer software package to build a website for all her customers to see. Consistent with embodiments of the invention, the website designer software package may utilize an assistive application 920 as described in greater detail below. While building the website, the user may enter text 110 into computing device 900 that may receive text 110.

Figure 3:
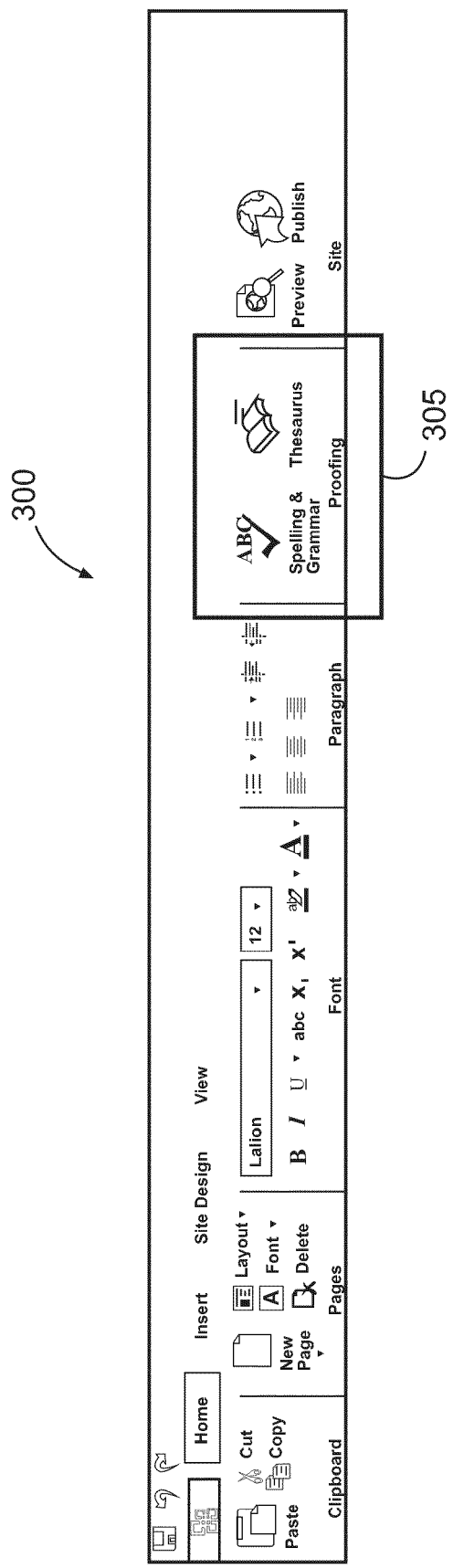
FIG. 3 is a screen shot illustrating a ribbon.

From stage 210, where computing device 900 receives text 110, method 200 may advance to stage 220 where computing device 900 may receive a spell check indication. For example, as the user nears completion of her website, she may realize that her illiteracy may seriously affect her potential customers' perception of her business if the text/content on her website were terribly misspelled or grammatically incorrect. The user may notice a "Review" tab in the website designer software package ribbon 300 as shown in FIG. 3. The user may then click on this tab and find a "Spelling and Grammar" icon/button 305 with an "ABC and a check-mark" that may indicate to her that it can help provide her a comforting check against the content (e.g. test 110) she had previously composed. Clicking on button 305 may cause computing device 900 to receive the spell check indication.

Once computing device 900 receives the spell check indication in stage 220, method 200 may continue to stage 230 where computing device 900 may perform a spelling check on received text 110 in response to the received spell check indication. For example, computing device 900 may perform a spelling check on text 110 that the user entered while building the website.

Figure 4:
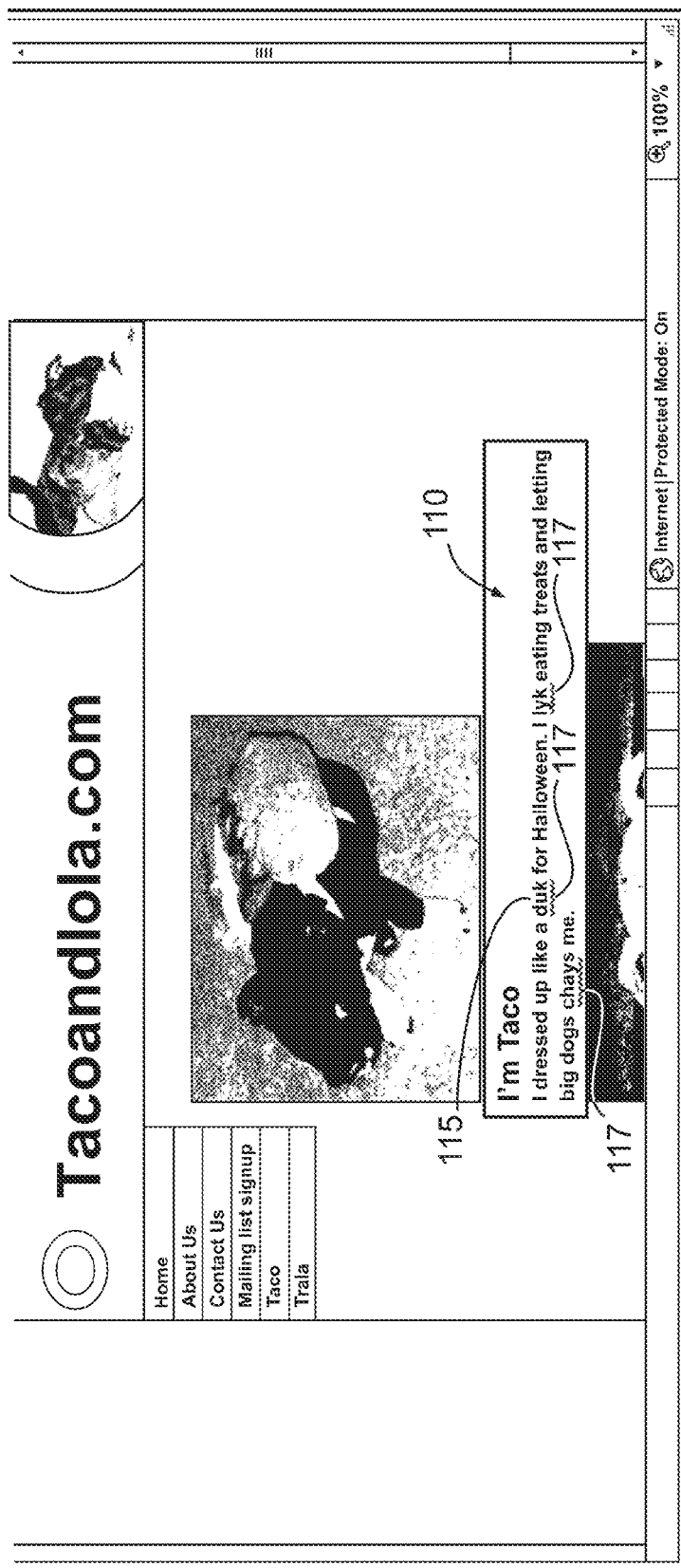
FIG. 4 is a screen shot illustrating misspelling indications in text.

After computing device 900 performs the spelling check in stage 230, method 200 may proceed to stage 240 where computing device 900 may provide, in response to the performed spelling check, misspelling indications 117 configured to indicate that at least one word 115 in received text 110 is misspelled. For example, after the user clicks on "spellcheck" button 305, the user may notice, as shown in FIG. 4, that a few of the words she has typed into the body of her website content have been misspelled. Each of these misspelled words may be highlighted by computing device 900 with misspelling indications 117 to respectively indicate these spelling discrepancies. For example, as shown in FIG. 4, misspelling indications 117 may comprise jagged lines placed under the misspelled words in text 110. Embodiments of the invention are not limited to jagged lines and other misspelling indications may be used.

From stage 240, where computing device 900 provides the misspelling indication, method 200 may advance to stage 250 where computing device 900 may receive a selection of the misspelling indication. For example, the user may click on misspelled word 115 that she had spelled in text 110 as shown in FIG. 4. In other words, the user may click on "duk" that has a misspelling indication 117 under it as shown in FIG. 4. In this way the user may send and computing device 900 may receive the selection of misspelling indication 117.

Once computing device 900 receives the selection of the misspelling indication 117 in stage 250, method 200 may continue to stage 260 where computing device 900 may display on a display device (e.g. one of output devices 914), in response to the received selection of misspelling indication 117, a plurality of suggested spellings 120 for the at least one word 115 and image 130 corresponding to first one of the plurality of suggested spellings 125 for at least one word 115. For example, once computing device 900 receives the selection of the misspelling indication 117, spell-check/grammar modal dialog box 105 may pops-up on the display with alternate suggestions for misspelled word 115 that the user might have meant to write as shown and discussed above with respect to FIG. 1.

Figure 5:
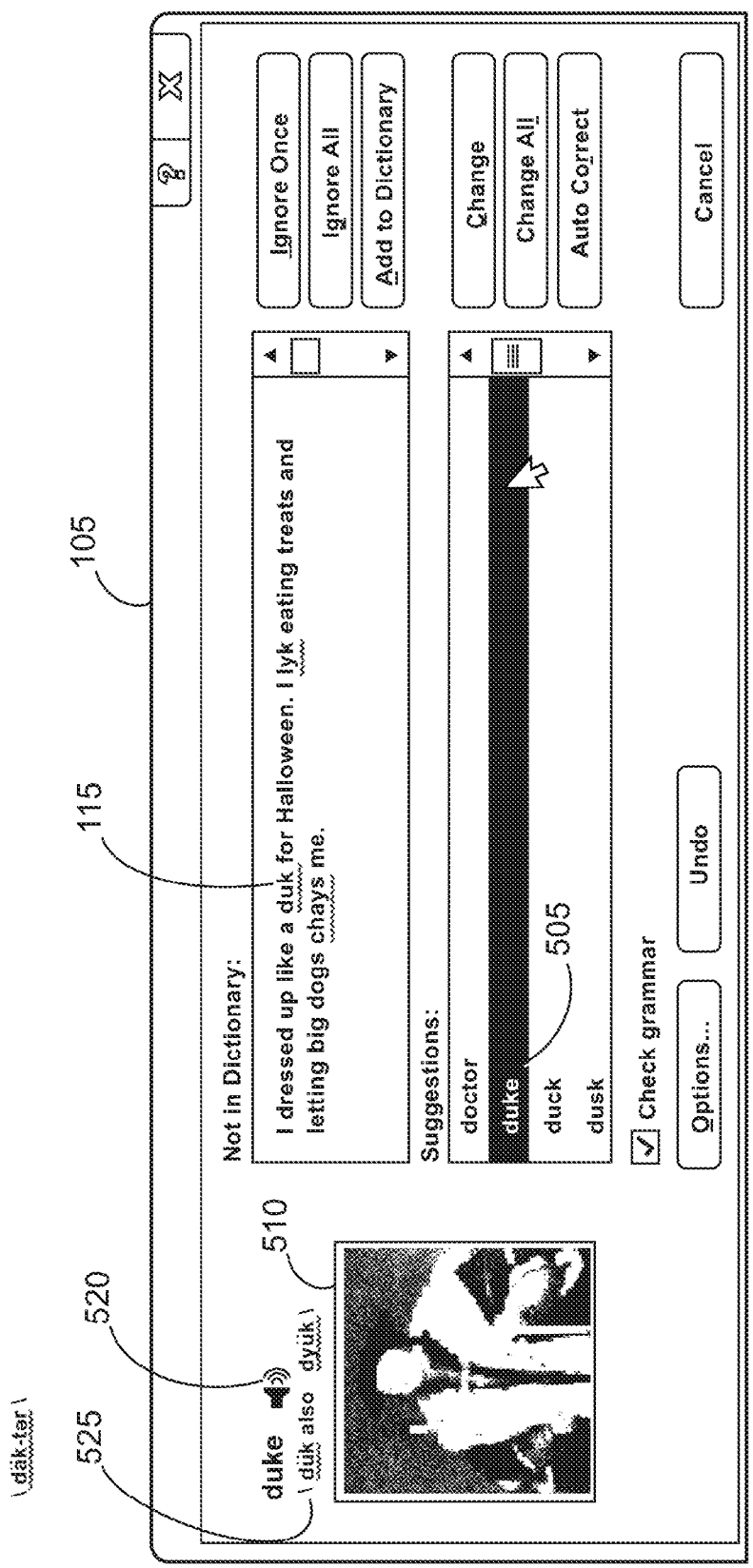
FIG. 5 is a screen shot further illustrating the dialog box.

As shown in FIG. 5, when the user selects a second suggested spelling 505 from dialog box 105, a second image 510 appears in dialog box 105. Accordingly a second phonetic spelling 525 appears and now second sound button 520 corresponds to second suggested spelling 505. As with first suggested spelling 125, after viewing second image 510 and listening to the sound corresponding to second image 510 after clicking second sound button 520, the user may determine that second suggested spelling 505 (e.g. "duke") is not what she intended.

Figure 6:
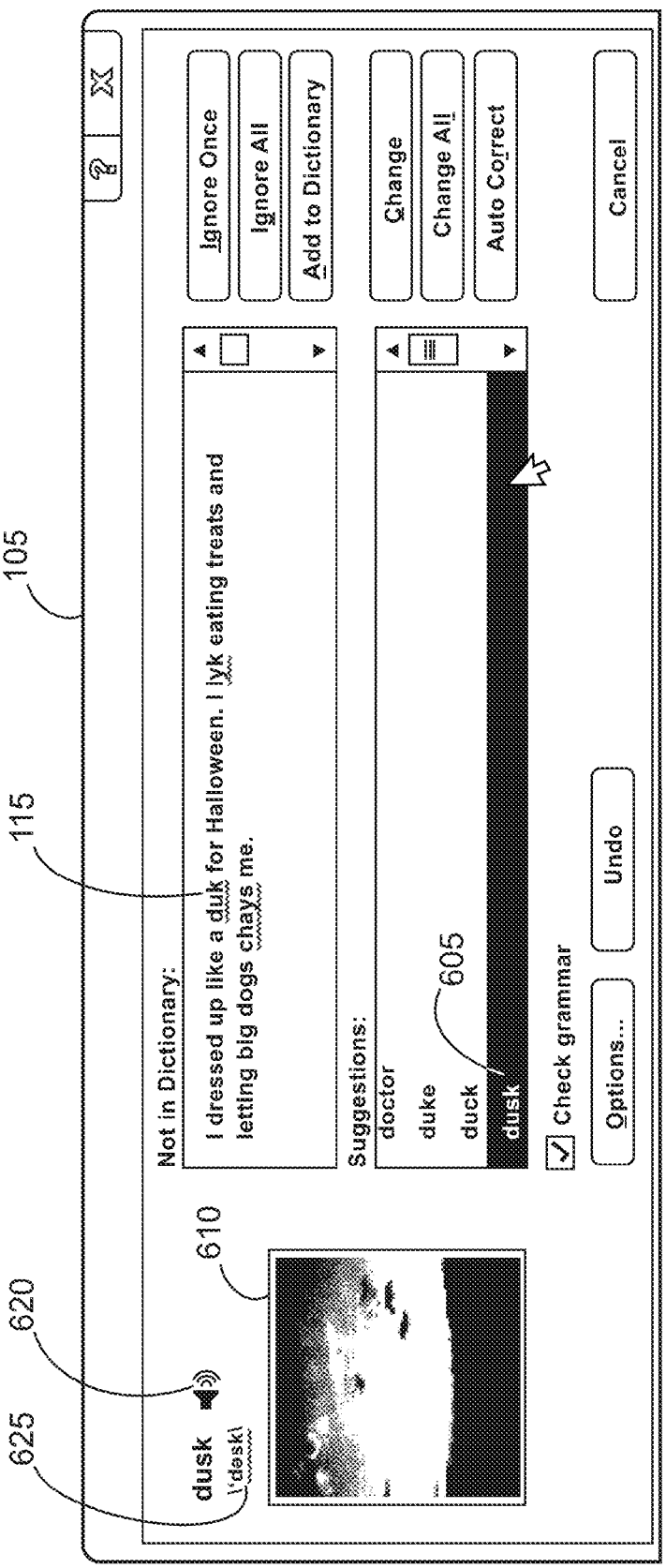
FIG. 6 is a screen shot further illustrating the dialog box.

As shown in FIG. 6, when the user selects a third suggested spelling 605 from dialog box 105, a third image 610 appears in dialog box 105. Accordingly a third phonetic spelling 625 appears and now third sound button 620 corresponds to third suggested spelling 605. As with first suggested spelling 125 and second suggested spelling 505, after viewing third image 610 and listening to the sound corresponding to third image 610 after clicking third sound button 620, the user may determine that third suggested spelling 605 (e.g. "dusk") is not what she intended.

Figure 7:
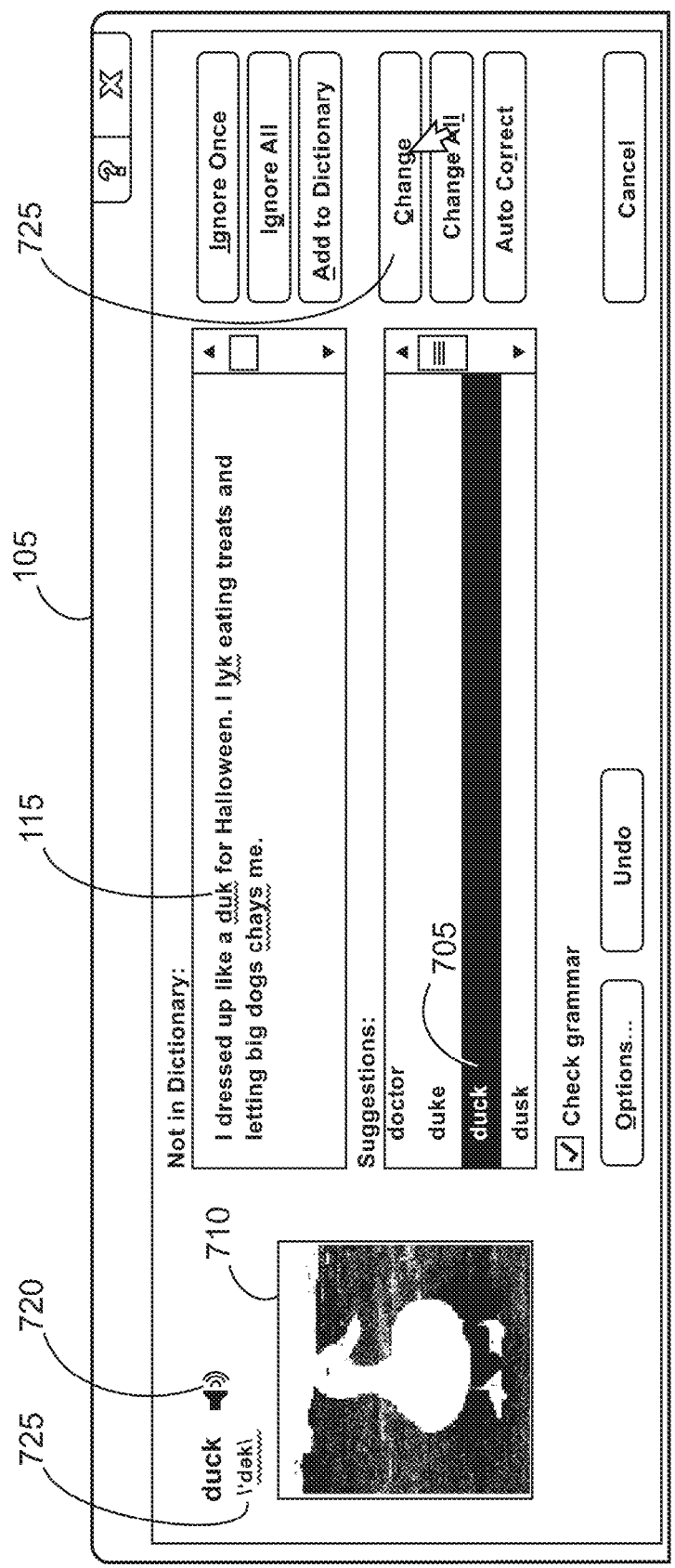
FIG. 7 is a screen shot further illustrating the dialog box.
Figure 8:
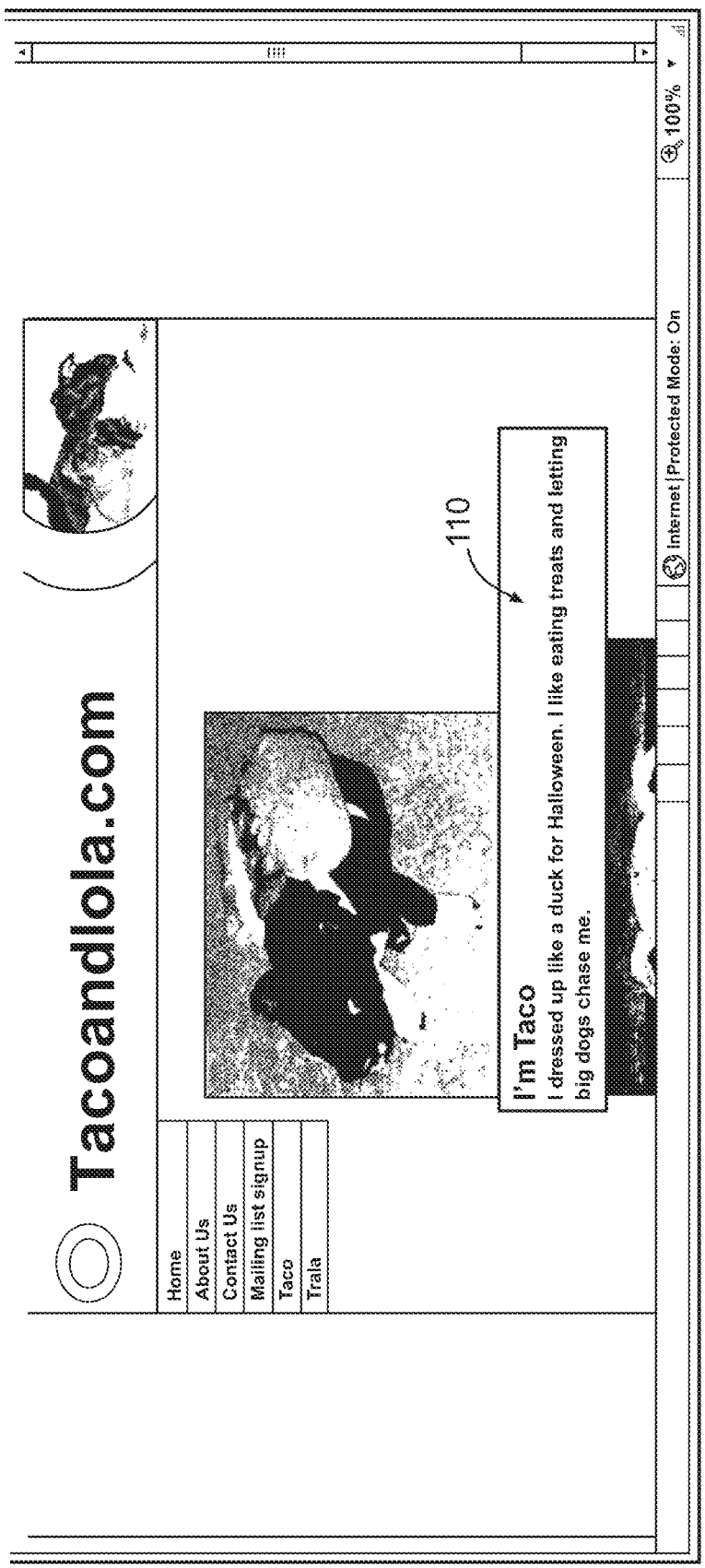
FIG. 8 is a screen shot illustrating corrected text.

As shown in FIG. 7, when the user selects a forth suggested spelling 705 from dialog box 105, a forth image 710 appears in dialog box 105. Accordingly a forth phonetic spelling 725 appears and now forth sound button 720 corresponds to forth suggested spelling 705. Unlike first suggested spelling 125, second suggested spelling 505, and third suggested spelling 605, after viewing forth image 710 and listening to the sound corresponding to forth image 710 after clicking forth sound button 720, the user may determine that forth suggested spelling 705 (e.g. "duck") is what she intended. Accordingly, the user may select change button 725. As a result of the user selecting change button 725, misspelled word 115 in text 110 may be changed to reflect the user's selected spelling correction as shown in FIG. 8. For example, as shown in FIG. 8, "duk" is not correctly shown as "duck." Upon completion of the user's evaluation/modification of the aforementioned spelling/grammatical items, she may feel an elevated level of confidence that her website is ready to be published to the rest of the world without her illiteracy impairment surfacing within the content of her website. Once computing device 900 displays the plurality of suggested spellings in stage 260, method 200 may then end at stage 270.

Consistent with embodiments of the invention, the user may highlight an entire string of words (e.g. phrase, sentence, paragraph, etc.) in text 110 to assist in verification of the string (e.g. audible pronunciation assistance). For example, if the user highlighted the string of words "the quick brown fox jumped over the lazy dog", ribbon 300 could display a speaker/"ear" icon with a "listen to text" label and upon clicking, the user may audibly hear the highlighted phrase.

Furthermore, consistent with embodiments of the invention, the user may point her mouse over any of the images. As a result, computing device 900 may provide hyperlinks to other descriptions and/or image over, for example, the internet.

Consistent with embodiments of the invention, the user may help improve the accuracy of the context-relevant/assistive images described above. While computing device 900 may show an image to the user for a given word, there is no guarantee that the image computing device 900 produces will be the best (e.g. most relevant and clear) image. For example, a better image (e.g. in terms of clarity or quality) may exist. Consequently, embodiments of the invention may provide the user with a link below the image that may say "contribute a better image." Clicking this link may launch a separate Web browser that may open up an image search page for the given word. From there, the user can specify (e.g. by clicking) a more relevant image for the word.

Consistent with embodiments of the invention, computing device 900 may take the aforementioned user feedback data, translate it into changes, and circulate it back into a spelling/grammar engine in assistive application 920. When doing this, computing device 900 may take into account several factors including frequency and location for example. Frequency may comprise the frequency with which users recommend an image for a given word. This may factor into computing device 900 deciding which image to show. Furthermore, with location, words may follow geographic boundaries, and the same word in some locations may convey a predominantly different meaning than the same word used elsewhere. The geographic locations of user feedback, determined by IP, and the geographic location of the end user, may also factor into which image computing device 900 may decide to show.

Furthermore, embodiments of the invention may also include a way to display other meanings of the same word (i.e. lift (verb), lift (noun—an elevator)). For example, a button may be provided that, when selected, may provide a drop down menu to display other meanings of the selected same word.

An embodiment consistent with the invention may comprise a system for providing assistive, context-relevant images. The system may comprise a memory storage and a processing unit coupled to the memory storage. The processing unit may be operative to receive text and to receive a spell check indication. In addition, the processing unit may be operative to perform a spelling check on the received text in response to the received spell check indication and to provide, in response to the performed spelling check, a misspelling indication configured to indicate that at least one word in the received text is misspelled. Also, the processing unit may be operative to receive a selection of the misspelling indication. Moreover, the processing unit may be operative to display on a display device, in response to the received selection of the misspelling indication, a plurality of suggested spellings for the at least one word and an image corresponding to a first one of the plurality of suggested spellings for the at least one word.

Another embodiment consistent with the invention may comprise a system for providing assistive, context-relevant images. The system may comprise a memory storage and a processing unit coupled to the memory storage. The processing unit may be operative to receive a selection of a misspelling indication. In addition, the processing unit may be operative to display on a display device, in response to the received selection of the misspelling indication: i) a plurality of suggested spellings for at least one word; ii) an image corresponding to a first one of the plurality of suggested spellings for the at least one word; and iii) a sound button corresponding to the image corresponding to the first one of the plurality of suggested spellings for the at least one word.

Yet another embodiment consistent with the invention may comprise a system for providing assistive, context-relevant images. The system may comprise a memory storage and a processing unit coupled to the memory storage. The processing unit may be operative to receive text and to receive a spell check indication. In addition, processing unit may be operative to perform a spelling check on the received text in response to the received spell check indication and to provide, in response to the performed spelling check, a misspelling indication configured to indicate that at least one word in the received text is misspelled. Also, the processing unit may be operative to receive a selection of the misspelling indication. Furthermore, the processing unit may be operative to display in a dialog box on a display device, in response to the received selection of the misspelling indication, a plurality of suggested spellings for the at least one word, an image corresponding to a first one of the plurality of suggested spellings for the at least one word, and a sound button corresponding to the image corresponding to the first one of the plurality of suggested spellings for the at least one word. Moreover, the processing unit may be operative to receive an indication that the sound button has been selected. In addition, the processing unit may be operative to, in response to the received indication that the sound button has been selected, provide over a speaker a sound corresponding to the image corresponding to the first one of the plurality of suggested spellings for the at least one word.

Figure 9:
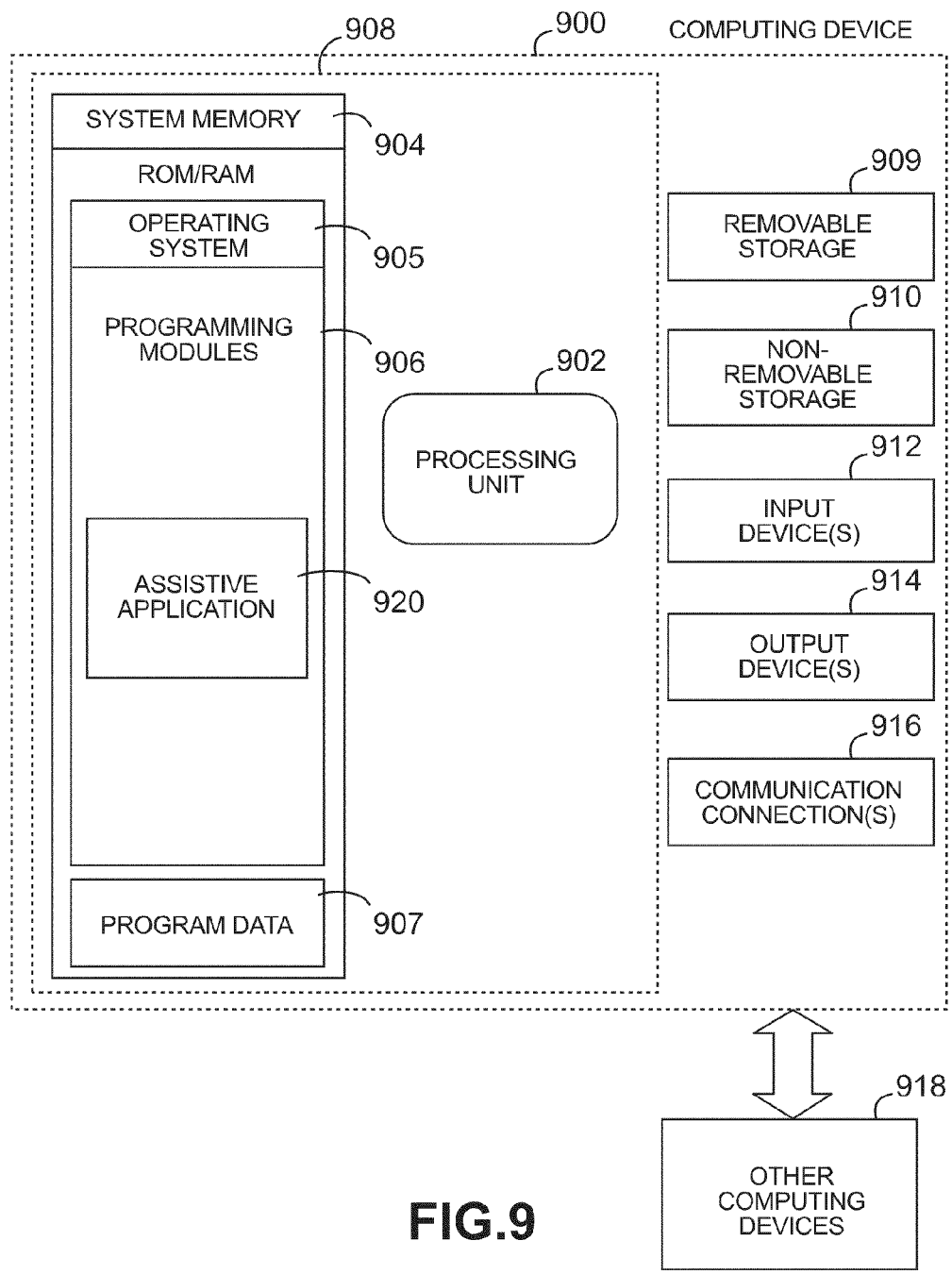
FIG. 9 is a block diagram of a system including a computing device.

FIG. 9 is a block diagram of a system including computing device 900. Consistent with an embodiment of the invention, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any of other computing devices 918, in combination with computing device 900. The aforementioned system, device, and processors are examples and other systems, devices, and processors may comprise the aforementioned memory storage and processing unit, consistent with embodiments of the invention.

With reference to FIG. 9, a system consistent with an embodiment of the invention may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include, for example, assistive application 920. Furthermore, embodiments of the invention may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g. assistive application 920) may perform processes including, for example, one or more method 200's stages as described above. The aforementioned process is an example, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing assistive, context-relevant images, the method comprising:
   receiving text;
   receiving a spell check indication;
   performing a spelling check on the received text in response to the received spell check indication;
   providing, in response to the performed spelling check, a misspelling indication configured to indicate that at least one word in the received text is misspelled;
   receiving a selection of the misspelling indication; and
   displaying on a display device, in response to the received selection of the misspelling indication, a plurality of suggested spellings for the at least one word and an image corresponding to a first one of the plurality of suggested spellings for the at least one word.

2. The method of claim 1, further comprising receiving an indication to replace the at least one word in the received text that is misspelled with a selected one of the plurality of suggested spellings for the at least one word.

3. The method of claim 2, further comprising displaying, on the display device, the received text with the selected one of the plurality of suggested spellings for the at least one word in place of the misspelled at least one word.

4. The method of claim 1, further comprising:
   receiving a section of a second one of the plurality of suggested spellings for the at least one word; and
   replacing, on the display device in response to the section of the second one of the plurality of suggested spellings for the at least one word, the image corresponding to the first one of the plurality of suggested spellings for the at least one word with an image corresponding to the second one of the plurality of suggested spellings for the at least one word.

5. The method of claim 1, wherein displaying on the display device, in response to the received selection of the misspelling indication, the plurality of suggested spellings for the at least one word and the image corresponding to the first one of the plurality of suggested spellings for the at least one word comprises displaying on the display device a sound button corresponding to the image corresponding to the first one of the plurality of suggested spellings for the at least one word.

6. The method of claim 5, wherein displaying, on the display device, the plurality of suggested spellings for the at least one word, the image corresponding to the first one of the plurality of suggested spellings for the at least one word, and the sound button comprises displaying in a dialog box the plurality of suggested spellings for the at least one word, the image corresponding to the first one of the plurality of suggested spellings for the at least one word, and the sound button.

7. The method of claim 5, further comprising receiving an indication that the sound button has been selected.

8. The method of claim 7, further comprising, in response to the received indication that the sound button has been selected, providing over a speaker a sound corresponding to the image corresponding to the first one of the plurality of suggested spellings for the at least one word.

9. The method of claim 1, wherein displaying on the display device, in response to the received selection of the misspelling indication, the plurality of suggested spellings for the at least one word and the image corresponding to the first one of the plurality of suggested spellings for the at least one word comprises displaying a phonetic spelling of the first one of the plurality of suggested spellings for the at least one word.

10. The method of claim 1, further comprising:
    receiving a selection of a plurality of words in the text; and
    providing, over a speaker, a sound corresponding to the selected plurality of words in the text.

11. The method of claim 1, wherein receiving the spell check indication comprises receiving the spell check indication in response to a user selecting a button on a ribbon displayed on the display device.

12. A computer-readable storage medium device that stores a set of instructions which when executed perform a method for providing assistive, context-relevant images, the method executed by the set of instructions comprising:
    receiving a selection of a misspelling indication; and
    displaying on a display device, in response to the received selection of the misspelling indication, a plurality of suggested spellings for at least one word, an image corresponding to a first one of the plurality of suggested spellings for the at least one word, and a sound button corresponding to the image corresponding to the first one of the plurality of suggested spellings for the at least one word.

13. The computer-readable storage medium device of claim 12, further comprising receiving an indication that the sound button has been selected.

14. The computer-readable storage medium device of claim 13, further comprising, in response to the received indication that the sound button has been selected, providing over a speaker a sound corresponding to the image corresponding to the first one of the plurality of suggested spellings for the at least one word.

15. The computer-readable storage medium device of claim 12, further comprising:
    receiving a section of a second one of the plurality of suggested spellings for the at least one word;
    replacing, on the display device in response to the section of the second one of the plurality of suggested spellings for the at least one word, the image corresponding to the first one of the plurality of suggested spellings for the at least one word with an image corresponding to the second one of the plurality of suggested spellings for the at least one word; and
    causing the sound button to correspond to the image corresponding to the second one of the plurality of suggested spellings for the at least one word.

16. The computer-readable storage medium device of claim 15, further comprising receiving an indication that the sound button has been selected.

17. The computer-readable storage medium device of claim 16, further comprising, in response to the received indication that the sound button has been selected, providing over a speaker a sound corresponding to the image corresponding to the second one of the plurality of suggested spellings for the at least one word.

18. The computer-readable storage medium device of claim 12, wherein receiving the spell check indication comprises receiving the spell check indication in response to a user selecting a button on a ribbon displayed on the display device.

19. The computer-readable storage medium device of claim 12, wherein displaying, on the display device, the plurality of suggested spellings for the at least one word, the image corresponding to the first one of the plurality of suggested spellings for the at least one word, and the sound button comprises displaying in a dialog box the plurality of suggested spellings for the at least one word, the image corresponding to the first one of the plurality of suggested spellings for the at least one word, and the sound button.

20. A system for providing assistive, context-relevant images, the system comprising:
a memory storage; and
a processing unit coupled to the memory storage, wherein the processing unit is operative to:
receive text;
receive a spell check indication;
perform a spelling check on the received text in response to the received spell check indication;
provide, in response to the performed spelling check, a misspelling indication configured to indicate that at least one word in the received text is misspelled;
receive a selection of the misspelling indication;
display in a dialog box on a display device, in response to the received selection of the misspelling indication, a plurality of suggested spellings for the at least one word, an image corresponding to a first one of the plurality of suggested spellings for the at least one word, and a sound button corresponding to the image corresponding to the first one of the plurality of suggested spellings for the at least one word;
receive an indication that the sound button has been selected; and
in response to the received indication that the sound button has been selected, provide over a speaker a sound corresponding to the image corresponding to the first one of the plurality of suggested spellings for the at least one word.

* * * * *